US011573992B2

(12) United States Patent
Zhong et al.

(10) Patent No.: US 11,573,992 B2
(45) Date of Patent: Feb. 7, 2023

(54) METHOD, ELECTRONIC DEVICE, AND STORAGE MEDIUM FOR GENERATING RELATIONSHIP OF EVENTS

(71) Applicant: BEIJING BAIDU NETCOM SCIENCE AND TECHNOLOGY CO., LTD., Beijing (CN)

(72) Inventors: Shangru Zhong, Beijing (CN); Yuguang Chen, Beijing (CN); Weihua Peng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 217 days.

(21) Appl. No.: 17/105,707

(22) Filed: Nov. 27, 2020

(65) Prior Publication Data

US 2021/0406295 A1   Dec. 30, 2021

(30) Foreign Application Priority Data

Jun. 30, 2020   (CN) .......................... 202010616899.5

(51) Int. Cl.
*G06F 16/33*   (2019.01)
*G06F 16/332*   (2019.01)
(Continued)

(52) U.S. Cl.
CPC ...... *G06F 16/3344* (2019.01); *G06F 16/3329* (2019.01); *G06F 40/279* (2020.01);
(Continued)

(58) Field of Classification Search
CPC ............. G06F 16/3344; G06F 16/3329; G06F 40/279; G06K 9/6288; G06K 9/6256; G06N 3/08
See application file for complete search history.

(56) References Cited

U.S. PATENT DOCUMENTS

2018/0121787 A1*   5/2018   Hashimoto .............. G06N 3/04
2021/0192277 A1*   6/2021   Andrade Silva ..... G06N 3/0454

FOREIGN PATENT DOCUMENTS

CN   111160027 A   5/2020
JP   2016170636 A   9/2016

OTHER PUBLICATIONS

Hiroyuki Naruse, "Office Action for JP Application No. 2020-217633", dated Mar. 8, 2022, JPO, Japan.
(Continued)

*Primary Examiner* — Sonia L Gay
(74) *Attorney, Agent, or Firm* — Bridgeway IP Law Group, PLLC; Jihun Kim

(57) ABSTRACT

A method for generating a relationship of events includes: obtaining a statement of a first event and a statement of a second event; generating a word sequence vector with first granularity and a word sequence vector with second granularity based on the statement of the first event; generating a word sequence vector with third granularity and a word sequence vector with fourth granularity based on the statement of the second event; generating a first fusion vector based on the word sequence vector with first granularity and the word sequence vector with second granularity; generating a second fusion vector based on the word sequence vector with third granularity and the word sequence vector with fourth granularity; and determining a relationship between the first event and the second event based on the first fusion vector and the second fusion vector.

15 Claims, 3 Drawing Sheets

(51) Int. Cl.
  *G06F 40/279*      (2020.01)
  *G06K 9/62*        (2022.01)
  *G06N 3/08*        (2006.01)

(52) U.S. Cl.
  CPC ......... *G06K 9/6288* (2013.01); *G06K 9/6256* (2013.01); *G06N 3/08* (2013.01)

(56) References Cited

OTHER PUBLICATIONS

Yi Cai et al., "Event Relationship Analysis for Temporal Event Search", DASFAA 2013, Part II, LNCS 7826, 2013, pp. 179-193, China.

Robert Abram, "Search Report for EP Application No. 20211583.8", dated May 27, 2021, EPO, Germany.

Seo Gwang Hoon, "Office Action for KR Application No. 10-2020-0182992", dated Jun. 30, 2022, KIPO, Republic of Korea.

* cited by examiner

METHOD, ELECTRONIC DEVICE, AND STORAGE MEDIUM FOR GENERATING RELATIONSHIP OF EVENTS

CROSS-REFERENCE TO RELATED APPLICATION

This application claims priority to Chinese Patent Application No. 202010616899.5, filed on Jun. 30, 2020, the entire contents of which are incorporated herein by reference.

FIELD

The disclosure relates to a field of computer technologies, mainly to fields of knowledge map, natural language processing and deep learning technologies, and particularly to a method for generating a relationship of events, an electronic device, and a storage medium.

BACKGROUND

An event is a series of activities carried out around a certain theme with participation of one or more roles (event subjects) within a specific period and space. There is a relationship between events, such as, a causal relationship. The causal relationship between the events may logically or relevantly describe an evolution rule of the events. The causal relationship between the events may sum up the evolution rule of the events, and relevant reasoning may be performed based on the evolution rule of the events, which may also play an important application value in a forecasting scenario such as a finance scenario and a risk control scenario.

Therefore, it is an urgent technical problem how to accurately determine the relationship between the events.

SUMMARY

According to a first aspect of the disclosure, a method for generating a relationship of events is provided. The method includes: obtaining a pair of events, the pair of events including a statement of a first event and a statement of a second event; generating a word sequence vector with first granularity and a word sequence vector with second granularity based on the statement of the first event; generating a word sequence vector with third granularity and a word sequence vector with fourth granularity based on the statement of the second event; generating a first fusion vector based on the word sequence vector with first granularity and the word sequence vector with second granularity; generating a second fusion vector based on the word sequence vector with third granularity and the word sequence vector with fourth granularity; and determining a relationship between the first event and the second event based on the first fusion vector and the second fusion vector.

According to another aspect of the disclosure, an electronic device is provided. The electronic device includes: at least one processor and a memory. The memory is communicatively coupled to the at least one processor. The memory is configured to store instructions executed by the at least one processor. When the instructions are executed by the at least one processor, the at least one processor is caused to implement the method for generating the relationship of events according to the first aspect.

According to another aspect of the disclosure, a non-transitory computer readable storage medium having computer instructions stored thereon is provided. The computer instructions are configured to cause a computer to execute the method for generating the relationship of events according to the first aspect.

It should be understood that, contents described in this section are not intended to identify key or important features of embodiments of the disclosure, nor is it intended to limit the scope of the disclosure. Other features of the disclosure may become apparent from the following description.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Description will be made below to a method and an apparatus for generating a relationship of events, an electronic device, and a storage medium according to embodiments of the disclosure with reference to accompanying drawings.

Figure 1:
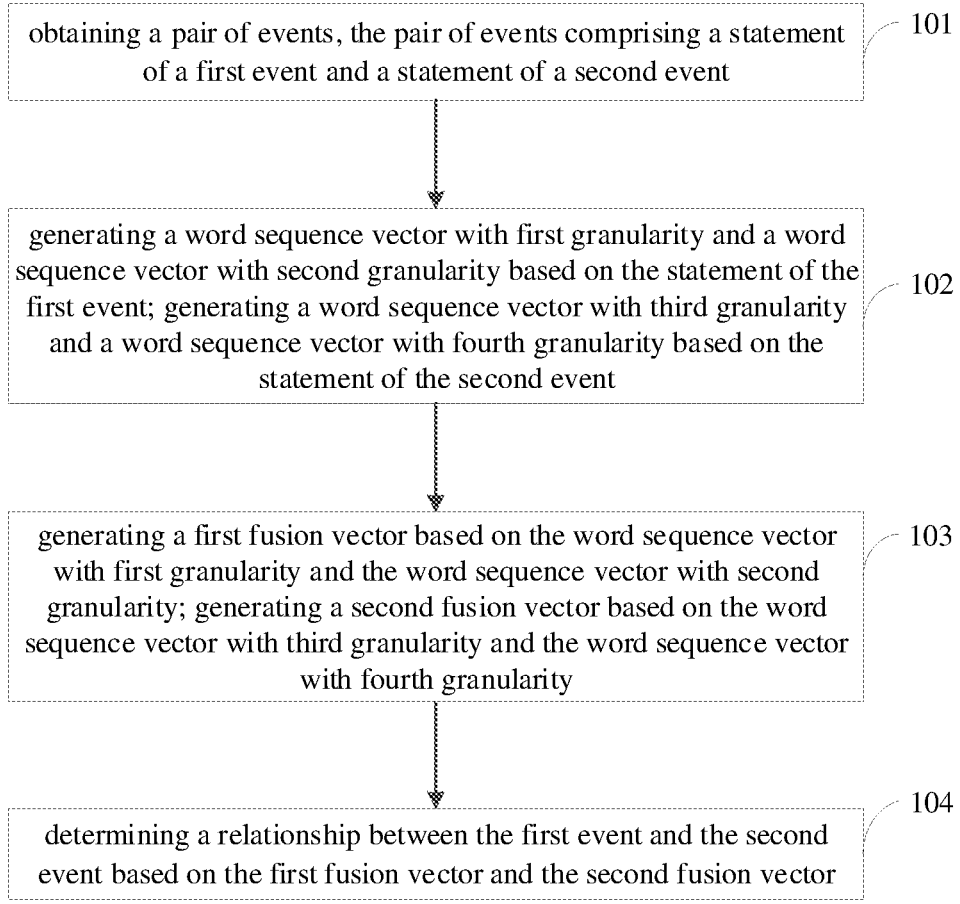
FIG. 1 is a flow chart illustrating a method for generating a relationship of events according to embodiments of the disclosure.

FIG. 1 is a flow chart illustrating a method for generating a relationship of events according to embodiments of the disclosure.

As illustrated in FIG. 1, the method includes the following.

At block 101, a pair of events is obtained. The pair of events includes a statement of a first event and a statement of a second event.

The pair of events refers to events having a relationship that is to be determined. For convenience of distinction, the pair of events is referred as the statement of the first event and the statement of the second event.

For example, the statement of the first event is "a president began sanctions on Iraq recently", and the statement of the second event is "the price of crude oil in the Middle East soared"; or the statement of the first event is "a president began sanctions on Iraq recently", and the statement of the second event is "a mixed-blood beauty of Iraq wins the Miss Universe".

At block 102, a word sequence vector with first granularity and a word sequence vector with second granularity are generated based on the statement of the first event. A word sequence vector with third granularity and a word sequence vector with fourth granularity are generated based on the statement of the second event.

The first granularity is different from the second granularity. The word sequence vector with first granularity includes a vector of each character and semantics of each character. The word sequence vector with second granularity includes a semantic expression of a complete event.

As a possible implementation, the first granularity refers to word granularities of multiple words obtained by segmenting the statement of the first event, thereby obtaining a word sequence with first granularity, of the statement of the first event, based on multiple words. The second granularity refers to argument granularities obtained by extracting events from the statement of the first event based on event arguments. A word sequence with second granularity, of the statement of the first event, is generated based on the argument granularities.

For example, the statement of the first event is: "a president began sanctions on Iraq recently".

The word sequence with first granularity is: "a president", "began", "sanctions", "Iraq" and "recently".

The word sequence with second granularity is: an event subject being "a president", and a trigger word being "sanctions".

The word sequence with first granularity of the statement of the first event is converted to the word sequence vector with first granularity. The word sequence with second granularity of the statement of the first event is converted to the word sequence vector with second granularity. Description will be made taking the word sequence with first granularity as an example. In some embodiments of the disclosure, each word in the word sequence with first granularity may be converted into a word vector with a preset dimension by employing a word embedding model, such as, a word2vec model, and then the word sequence vector with first granularity may be generated based on accumulation of the word vectors of respective words. In other words, the word sequence vector with first granularity includes the word vector of each word.

As another possible implementation, a trained deep neural network model, such as an ERNIE (enhanced representation from knowledge integration) model, may also be employed to generate the word vector of each word. The word vector generated based on the ERNIE model may include semantic information and context information of the word, which may improve the accuracy of subsequent determining a relationship between events. The word sequence vector with first granularity is generated based on the accumulation of the word vectors of respective words.

The principle for generating the word sequence vector with second granularity is the same as the above principle, which is not elaborated herein.

The third granularity is also different from the fourth granularity. In embodiments of the disclosure, the third granularity and the fourth granularity are two granularities corresponding to the first granularity and the second granularity, which may refer to the description for the first granularity and the second granularity, and the principle for generating the word sequence vector with third granularity and the word sequence vector with fourth granularity is the same as that for generating the word sequence vector with first granularity and the word sequence vector with second granularity, which is not elaborated herein.

At block 103, a first fusion vector is generated based on the word sequence vector with first granularity and the word sequence vector with second granularity, and a second fusion vector is generated based on the word sequence vector with third granularity and the word sequence vector with fourth granularity.

In embodiments, by generating the first fusion vector based on the word sequence vector with first granularity and the word sequence vector with second granularity, for the statement of the first event, the first fusion vector corresponding to the statement of the first event may be determined based on word sequence vectors with different granularities, such that the first fusion vector carries more information and includes more generalized features of events. Based on the same principle, for the statement of the second event, the second fusion vector corresponding to the statement of the second event may also be determined based on word sequence vectors with different granularities, such that the second fusion vector carries more information and includes more generalized features of events. In the way, the accuracy and generalization of determining the relationship between events may be improved.

At block 104, a relationship between the first event and the second event is determined based on the first fusion vector and the second fusion vector.

The relationship includes a causal relationship, a progressive relationship and a turning relationship, which is not limited in embodiments.

In some embodiments of the disclosure, the relationship may be determined based on a trained recognition model. The recognition model may correspond to the relationship. For example. The recognition model is configured to recognize whether there is the causal relationship between the events, or to recognize whether there is the turning relationship between the events. In other words, for a relationship to be recognized, the recognition model has learned a correspondence between the fusion vector of the event and the relationship between events. The relationship between the first event and the second event may be determined based on the recognition model.

With the method for generating the relationship of events according to the disclosure, the statement of the first event and the statement of the second event are obtained. The word sequence vector with first granularity and the word sequence vector with second granularity are generated based on the statement of the first event. The word sequence vector with third granularity and the word sequence vector with fourth granularity are generated based on the statement of the second event. The first fusion vector is generated based on the word sequence vector with first granularity and the word sequence vector with second granularity. The second fusion vector is generated based on the word sequence vector with third granularity and the word sequence vector with fourth granularity. The relationship between the first event and the second event is determined based on the first fusion vector and the second fusion vector. With the disclosure, for a statement of an event, the fusion vector corresponding to the statement of the event is determined based on the word sequence vectors with different granularities, such that the fusion vector includes more generalized features of the event, thereby improving the accuracy and generalization of determining the relationship between events.

Description is made in the above embodiment to generating the word sequence vectors with two granularities based on the statement of the first event. With the disclosure, description will be made in detail to how to generate the word sequence vectors with two granularities. Based on the above embodiment, FIG. 2 is a flow chart illustrating a method for generating a relationship of events according to other embodiments of the disclosure.

Figure 2:
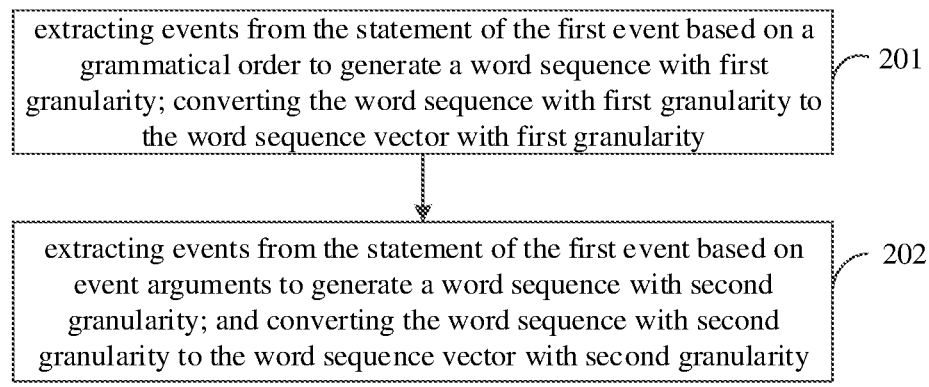
FIG. 2 is a flow chart illustrating a method for generating a relationship of events according to other embodiments of the disclosure.

As illustrated in FIG. 2, the action at block 102 includes the following.

At block 201, events are extracted from the statement of the first event based on a grammatical order to generate a word sequence with first granularity, and the word sequence with first granularity is converted to the word sequence vector with first granularity.

In some embodiments, the statement of the first event is segmented based on the grammatical order to obtain multiple words included in the statement. The word sequence with first granularity, including multiple words, is obtained based on the grammatical order and positions of multiple words in the statement.

The word sequence with first granularity of the statement of the first event is converted to the word sequence vector with first granularity, and the word sequence with second granularity of the statement of the first event is converted to the word sequence vector with second granularity. The word sequence vector with first granularity is taken as an example for description. In some embodiments of the disclosure, each word in the word sequence with first granularity is converted to the word vector with the preset dimension by employing the word embedding model, such as the word2vec model, and then the word sequence vector with first granularity is generated by the accumulation of the word vectors of respective words. In other words, the word sequence vector with first granularity includes the word vector of each word.

As another possible implementation, a trained deep neural network model may also be employed to generate the word vector of each word, such as the ERNIE model. The word vector generated based on the ERNIE model may include the semantic information and context information of the word, which may improve the accuracy of subsequent determining a relationship between the events.

The word sequence vector with first granularity is generated based on the accumulation of the word vectors of respective words in the word sequence with first granularity For example, the statement of the first event is: "a president began sanctions on Iraq recently".

The word sequence with first granularity is: "a president", "began", "sanctions", "Iraq" and "recently".

The word sequence with first granularity is converted to the word sequence vector with first granularity, as illustrated in the following.

The word sequence vector with first granularity is: v (a president)+v (sanctions)+v(Iraq), where, v ("word") represents a word vector corresponding to the "word". The word vectors of respective words are summed to obtain the word sequence vector with first granularity.

At block 202, events are extracted from the statement of the first event based on event arguments to generate a word sequence with second granularity. The word sequence with second granularity is converted to the word sequence vector with second granularity.

Event argument information is extracted from the statement of the first event based on the event argument extraction technology. The event argument information includes: an event subject, an event trigger word, an event attribute and so on. The event subject may be divided into an agent subject and a patient subject. The agent subject is a sender for performing action, behavior or activity indicated by a verb, while the patient subject is a receiver for receiving the action, behavior or activity. An agent attribute means that the agent subject is a person or a thing. An agent number refers to the number of agent subjects. A patient number refers to the number of patient subjects. The event trigger word is a word that enables an event to happen.

For example, the statement of the first event is: "a president began sanctions on Iraq recently". The word sequence with second granularity generated by extracting the events based on the event arguments is: the event subject being "a president", and the trigger word being "sanctions".

The word sequence with second granularity is converted to the word sequence vector with second granularity based on the above method.

The word sequence vector with second granularity is: v (event subject)+v (a president)+v (trigger word)+v (sanctions), where, v ("word") represents a word vector corresponding to the "word". The word vectors of respective words are summed to obtain the word sequence vector with second granularity.

In embodiments, the word sequence vector with second granularity based on the event arguments may express the statement of the first event based on the semantics of the event, which may realize the accurate determination for the relationship between events. Comparing with the existing technical solution that a subject-predicate-object structure is employed for representing the relationship between events, the semantics expressed by the word sequence vector with second granularity based on the argument granularities is more complete. For example, a sequence extracted from a statement "gold price rises" based on the subject-predicate-object structure is "price rises", while a sequence obtained by extracting events based on the event argument is "event subject=gold, event attribute=price, event trigger word=rise".

With the method for generating the relationship of events according to embodiments, for the statement of the first event, after event extraction and vector conversion are performed by employing different granularities, the word sequence vector with first granularity based on the word granularity and the word sequence vector with second granularity based on information granularity of the event argument are obtained respectively. Since the word sequence vector with second granularity includes a more complete and generalized semantic representation of the statement of the first event, the accuracy of determining the relationship between candidate events may be improved.

Based on the above embodiments, generating the word sequence vector with third granularity and the word sequence vector with fourth granularity based on the statement of the second event at block 102 may be implemented by: extracting events from the statement of the second event based on a grammatical order to generate a word sequence with third granularity; converting the word sequence with third granularity to the word sequence vector with third granularity; extracting events from the statement of the second event based on event arguments to generate a word sequence with fourth granularity; and converting the word sequence with fourth granularity to the word sequence vector with fourth granularity.

In detail, the action in this embodiment may refer to the description for the action at blocks 201-202 in the above embodiment, which has the same principle and is not elaborated here.

With the method for generating the relationship of events according to embodiments, for the statement of the second event, after event extraction and vector conversion are performed by employing different granularities, the word sequence vector with third granularity based on the word granularity and the word sequence vector with fourth granularity based on information granularity of the event argument are obtained respectively. Since the word sequence vector with fourth granularity includes a more complete and generalized semantic representation of the statement of the second event, the accuracy of determining the relationship between candidate events may be improved.

Figure 3:
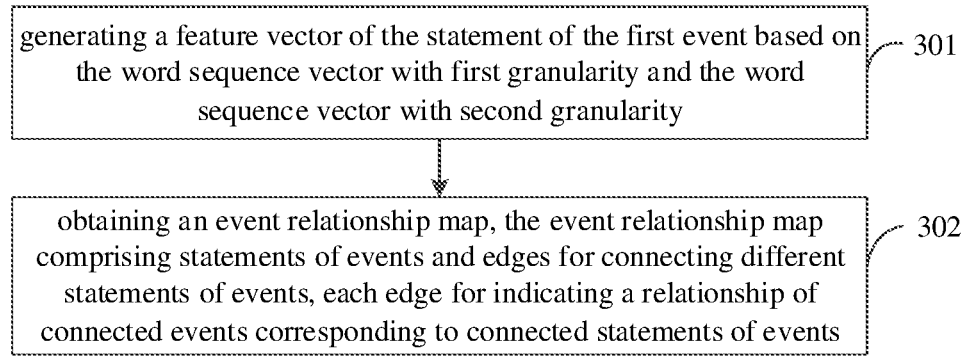
FIG. 3 is a flow chart illustrating a method for generating a relationship of events according to other embodiments of the disclosure.

Based on the above embodiment, FIG. 3 is a flow chart illustrating a method for generating a relationship of events according to another embodiment of the disclosure.

As illustrated in FIG. 3, the action at block 103 includes the following.

At block 301, a feature vector of the statement of the first event is generated based on the word sequence vector with first granularity and the word sequence vector with second granularity.

In some embodiments of the disclosure, the word sequence vector with first granularity and the word sequence vector with second granularity are spliced to obtain the feature vector of the statement of the first event.

For example, when the word sequence vector with first granularity is [1, 2, 3, 4] and the word sequence vector with second granularity is [5, 6, 7, 8, 9], the feature vector of the statement of the first event obtained after the splicing is [1, 2, 3, 4, 5, 6, 7, 8, 9].

At block 302, an event relationship map is obtained. The event relationship map includes statements of events and edges for connecting different statements of events, and each edge indicates a relationship of connected events corresponding to connected statements of events.

The event relationship map is pre-established. A knowledge map of the relationship among different statements of events is constructed in the event relationship map. Different statements of events are connected through the edges, that is, the relationships between different statements of events is indicated by the edges, to realize subsequent determination for the relationship between events based on the knowledge map. For the feature vector of one event, feature vectors of other events adjacent to the event are aggregated to improve the information contained in the feature vector of each event. In embodiments, the relationship between events being the causal relationship is taken as an example for description.

Figure 4:
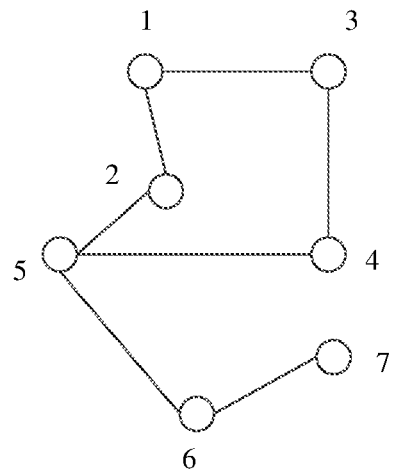
FIG. 4 is a schematic diagram illustrating an event relationship map according to embodiments of the disclosure.

For example, there is the causal relationship between a statement of an event e1 and a statement of an event e2. For example, an event "a president began sanctions on Iraq recently" causes an event "the price of crude oil in the Middle East soared". There is the causal relationship between the statement of the event e2 and a statement of an event e3. For example, the event "the price of crude oil in the Middle East soared" causes an event "risk aversion in financial markets is rising". In this case, an event causality map may be constructed as: e1→e2→e3. As illustrated in FIG. 4, in the event causality map, a node 1 represents the statement of the event e1, a node 2 represents the statement of the event e2, a node 3 represents the statement of the event e3, and a node 4 represents the statement of the event e4. The edge connecting two nodes in the event causality map indicates that there is the causal relationship between statements of two events, and other nodes connected with one node through the edge are neighbors of the node.

At block 303, a statement of a target event, connected with the statement of the first event through a corresponding edge, is determined based on the event relationship map.

As illustrated in FIG. 4, when the node 1 represents the statement of the first event, the nodes connected with the node 1 through edges are the node 2 and the node 3. In other words, the statement of the event corresponding to the node 2 and the statement of the event corresponding to the node 3 are the statements of the target events having a relationship with the statement of the first event.

At block 304, the feature vector of the statement of the first event and a feature vector of the statement of the target event are inputted into a map learning model to obtain the first fusion vector of the statement of the first event.

In embodiments, the method for generating the feature vector of the statement of the target event is the same as the method for generating the feature vector of the statement of the first event, which is not elaborated here.

A map learning model may be a graph convolution network (GCN), a GraphSage (graph sample and aggregate) algorithm or a graph attention network (GAN). Considering the computational efficiency and the generalization ability to unknown nodes, the GraphSage algorithm is selected as the map learning model.

In embodiments, the feature vector of the statement of the first event and the feature vector of the statement of the target event are inputted into the map learning model, such that the map learning model may fuse the feature vector of the statement of the first event with the feature vector of the statement of at least one target event which has the relationship with the statement of the first event, to output the first fusion vector of the statement of the first event. The features of statements having the relationship may be used to indicate such relationship. Therefore, feature vectors of statements of multiple events having the relationship with the first event are fused with the feature vector of the statement of the first event, such that the first fusion vector of the statement of the first event may include more generalized feature information for determining the relationship.

Based on the same principle, determining the second fusion vector of the statement of the second event may be implemented by: generating a feature vector of the statement of the second event based on the word sequence vector with third granularity and the word sequence vector with fourth granularity; obtaining an event relationship map, the event relationship map including statements of events and edges for connecting different statements of events, each edge for indicating a relationship of connected events corresponding to connected statements of events; determining a statement of a target event, connected with the statement of the second event through a corresponding edge, based on the event relationship map; and inputting the feature vector of the statement of the second event and a feature vector of the statement of the target event into a map learning model to obtain the second fusion vector of the statement of the second event.

In detail, the method for generating the second fusion vector of the statement of the second event may refer to the above method for generating the first fusion vector of the statement of the first event, which has the same principle and is not elaborated here.

With the method for generating the relationship of events according to embodiments, for the statement of each event, two word sequence vectors with different granularities are spliced to obtain the feature vector of the statement of the event. Based on the event relationship map, the feature vectors of other target event statements having the relationship with the event are aggregated to obtain the fusion vector of the statement of the event. The fusion vector fuses the feature of the statement of the event with the features of other similar events having the relationship with the event, such that the fusion vector of the statement of the event includes more generalized feature information for determining the relationship, and improves the accuracy of determining the relationship between events.

Based on the above embodiments, in some embodiments of the disclosure, after the first fusion vector of the statement of the first event and the second fusion vector of the statement of the second event are determined, the first fusion vector and the second fusion vector are spliced to generate a third fusion vector, and the relationship is determined based on the third fusion vector. In some embodiments, the first fusion vector of the statement of the first event and the second fusion vector of the statement of the second event may be input into a full connection layer. Based on determined weights, the third fusion vector is obtained by weighted splicing the first fusion vector and the second fusion vector in the full connection layer. The third fusion vector is inputted into a classification layer to output a two-dimensional vector for indicating a probability of whether there is the relationship between the statement of the first event and the statement of the second event. It is determined whether there is the relationship between the statement of the first event and the statement of the second event based on the probability. In this way, the first fusion vector and the second fusion vector which include more generalized semantic features are fused, thereby determining the relationship, and improving the generalization effect and accuracy.

To implement the above embodiments, the disclosure also provides an apparatus for generating a relationship of events.

Figure 5:
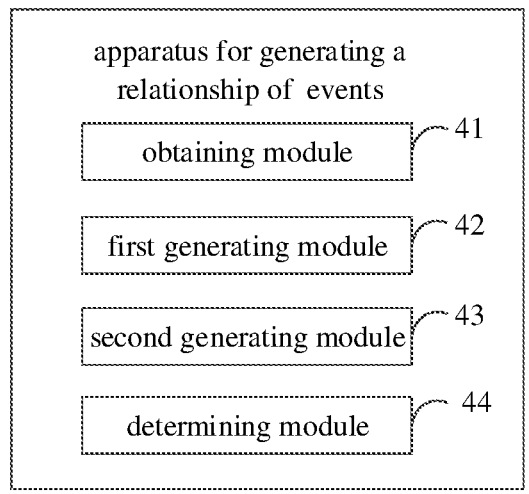
FIG. 5 is a block diagram illustrating an apparatus for generating a relationship of events according to embodiments of the disclosure.

FIG. 5 is a block diagram illustrating an apparatus for generating a relationship of events according to embodiments of the disclosure.

As illustrated in FIG. 5, the apparatus includes: an obtaining module 41, a first generating module 42, a second generating module 43, and a determining module 44.

The obtaining module 41 is configured to obtain a pair of events. The pair of events includes a statement of a first event and a statement of a second event.

The first generating module 42 is configured to generate a word sequence vector with first granularity and a word sequence vector with second granularity based on the statement of the first event, and to generate a word sequence vector with third granularity and a word sequence vector with fourth granularity based on the statement of the second event.

The second generating module 43 is configured to generate a first fusion vector based on the word sequence vector with first granularity and the word sequence vector with second granularity, and to generate a second fusion vector based on the word sequence vector with third granularity and the word sequence vector with fourth granularity.

The determining module 44 is configured to determine a relationship between the first event and the second event based on the first fusion vector and the second fusion vector.

In a possible implementation of embodiments of the disclosure, the first generating module 42 is configured to: extract events from the statement of the first event based on a grammatical order to generate a word sequence with first granularity, and convert the word sequence with first granularity to the word sequence vector with the first granularity; and extract events from the statement of the first event based on event arguments to generate a word sequence with second granularity; convert the word sequence with second granularity to the word sequence vector with second granularity.

In a possible implementation of embodiments of the disclosure, the first generating module is also configured to: extract events from the statement of the second event based on a grammatical order to generate a word sequence with third granularity; convert the word sequence with third granularity to the word sequence vector with third granularity; and extract events from the statement of the second event based on event arguments to generate a word sequence with fourth granularity, and convert the word sequence with fourth granularity to the word sequence vector with fourth granularity.

In a possible implementation of embodiments of the disclosure, the second generating module 43 is configured to: generate a feature vector of the statement of the first event based on the word sequence vector with first granularity and the word sequence vector with second granularity; obtain an event relationship map, the event relationship map including statements of events and edges for connecting different statements of events, and each edge for indicating a relationship of connected events corresponding to connected statements of events; determine a statement of a target event, connected with the statement of the first event through a corresponding edge, based on the event relationship map; and input the feature vector of the statement of the first event and a feature vector of the statement of the target event into a map learning model to obtain the first fusion vector of the statement of the first event.

In a possible implementation of embodiments of the disclosure, the second generating module 43 is also configured to: generate a feature vector of the statement of the second event based on the word sequence vector with third granularity and the word sequence vector with fourth granularity; obtain an event relationship map, the event relationship map including statements of events and edges for connecting different statements of events, each edge for indicating a relationship of connected events corresponding to connected statements of events; determine a statement of a target event, connected with the statement of the second event through a corresponding edge, based on the event relationship map; and input the feature vector of the statement of the second event and a feature vector of the statement of the target event into a map learning model to obtain the second fusion vector of the statement of the second event.

In a possible implementation of embodiments of the disclosure, the determining module 44 is configured to: generate a third fusion vector by splicing the first fusion vector and the second fusion vector; and determine the relationship based on the third fusion vector.

It should be noted that, description for the method for generating the relationship of events in the above embodiments is also applicable to the apparatus for generating the relationship of events in this embodiment, and has the same principle, which is not elaborated here.

With the apparatus for generating the relationship of events according to the disclosure, the statement of the first event and the statement of the second event are obtained. The word sequence vector with first granularity and the word sequence vector with second granularity are generated based on the statement of the first event. The word sequence vector with third granularity and the word sequence vector with fourth granularity are generated based on the statement of the second event. The first fusion vector is generated based on the word sequence vector with first granularity and the word sequence vector with second granularity. The second fusion vector is generated based on the word sequence vector with third granularity and the word sequence vector with fourth granularity. The relationship between the first event and the second event is determined based on the first fusion vector and the second fusion vector.

With the disclosure, the fusion vector corresponding to the statement of the event is determined based on the word sequence vectors with different granularities, such that the fusion vector includes more generalized event features, thereby improving the accuracy and generalization of determining the relationship between events.

To achieve the above embodiments, embodiments of the present disclosure provide an electronic device. The electronic device includes: at least one processor and a memory. The memory is communicatively coupled to the at least one processor. The memory is configured to store instructions executed by the at least one processor. When the instructions are executed by the at least one processor, the at least one processor is caused to implement the method for generating the relationship of events according to the above embodiments.

To achieve the above embodiments, embodiments of the present disclosure provide a non-transitory computer readable storage medium having computer instructions stored thereon. The computer instructions are configured to cause a computer to execute the method for generating the relationship of events according to the above embodiments.

According to embodiments of the disclosure, the disclosure also provides an electronic device and a readable storage medium.

Figure 6:
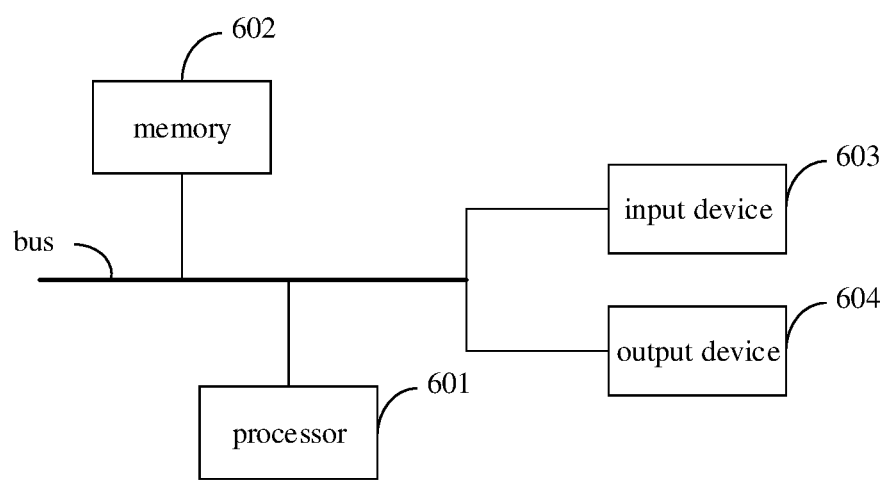
FIG. 6 is a block diagram illustrating an electronic device capable of implementing a method for generating a relationship of events according to embodiments of the disclosure.

As illustrated in FIG. 6, FIG. 6 is a block diagram illustrating an electronic device capable of implementing a method for generating a relationship of events according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 6, the electronic device includes: one or more processors 601, a memory 602, and interfaces for connecting various components, including a high-speed interface and a low-speed interface. Various components are connected to each other through different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 6, a processor 601 is taken as an example.

The memory 602 is a non-transitory computer readable storage medium provided by the disclosure. The memory is configured to store instructions executable by at least one processor, to enable the at least one processor to execute a method for generating a relationship of events provided by the disclosure. The non-transitory computer readable storage medium provided by the disclosure is configured to store computer instructions. The computer instructions are configured to enable a computer to execute the method for generating the relationship of events provided by the disclosure.

As the non-transitory computer readable storage medium, the memory 602 may be configured to store non-transitory software programs, non-transitory computer executable programs and modules, such as program instructions/modules (such as, the obtaining module 41, the first generating module 42, the second generating module 43 and the determining module 44 illustrated in FIG. 5) corresponding to the method for generating the relationship of events according to embodiments of the disclosure. The processor 601 is configured to execute various functional applications and data processing of the server by operating non-transitory software programs, instructions and modules stored in the memory 602, that is, implements the method for generating the relationship of events according to the above method embodiment.

The memory 602 may include a storage program region and a storage data region. The storage program region may store an application required by an operating system and at least one function. The storage data region may store data created according to predicted usage of the electronic device based on the semantic representation. In addition, the memory 602 may include a high-speed random access memory, and may also include a non-transitory memory, such as at least one disk memory device, a flash memory device, or other non-transitory solid-state memory device. In some embodiments, the memory 602 may alternatively include memories remotely located to the processor 601, and these remote memories may be connected to the electronic device capable of implementing the method for generating the relationship of events via a network. Examples of the above network include, but are not limited to, an Internet, an intranet, a local area network, a mobile communication network and combinations thereof.

The electronic device capable of implementing the method for generating the relationship of events may also include: an input apparatus 603 and an output device 604. The processor 601, the memory 602, the input device 603, and the output device 604 may be connected via a bus or in other means. In FIG. 6, the bus is taken as an example.

The input device 603 may receive inputted digital or character information, and generate key signal input related to user setting and function control of the electronic device capable of implementing the method for generating the relationship of events, such as a touch screen, a keypad, a mouse, a track pad, a touch pad, an indicator stick, one or more mouse buttons, a trackball, a joystick and other input device. The output device 604 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or an LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and usually interact via the communication network. A relationship between the client and the server is generated by computer programs operated on a corresponding computer and having a client-server relationship with each other.

With the technical solution according to embodiments of the disclosure, the statement of the first event and the statement of the second event are obtained. The word sequence vector with first granularity and the word sequence vector with second granularity are generated based on the statement of the first event. The word sequence vector with third granularity and the word sequence vector with fourth granularity are generated based on the statement of the second event. The first fusion vector is generated based on the word sequence vector with first granularity and the word sequence vector with second granularity. The second fusion vector is generated based on the word sequence vector with third granularity and the word sequence vector with fourth granularity. The relationship between the first event and the second event is determined based on the first fusion vector and the second fusion vector. With the disclosure, the fusion vector corresponding to the statement of the event is determined based on the word sequence vectors with different granularities, such that the fusion vector includes more generalized event features, thereby improving the accuracy and generalization of determining the relationship between events.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for generating a relationship of events, comprising:
    obtaining a pair of events, the pair of events comprising a statement of a first event and a statement of a second event;
    generating a word sequence vector with first granularity and a word sequence vector with second granularity based on the statement of the first event;
    generating a word sequence vector with third granularity and a word sequence vector with fourth granularity based on the statement of the second event;
    generating a first fusion vector based on the word sequence vector with first granularity and the word sequence vector with second granularity;
    generating a second fusion vector based on the word sequence vector with third granularity and the word sequence vector with fourth granularity; and
    determining a relationship between the first event and the second event based on the first fusion vector and the second fusion vector,
    wherein generating the word sequence vector with first granularity and the word sequence vector with second granularity based on the statement of the first event comprises:
    extracting events from the statement of the first event based on a grammatical order to generate a word sequence with first granularity;
    converting the word sequence with first granularity to the word sequence vector with first granularity;
    extracting events from the statement of the first event based on event arguments to generate a word sequence with second granularity; and
    converting the word sequence with second granularity to the word sequence vector with second granularity.

2. The method of claim 1, wherein generating the word sequence vector with third granularity and the word sequence vector with fourth granularity based on the statement of the second event comprises:

extracting events from the statement of the second event based on a grammatical order to generate a word sequence with third granularity;
converting the word sequence with third granularity to the word sequence vector with third granularity;
extracting events from the statement of the second event based on event arguments to generate a word sequence with fourth granularity; and
converting the word sequence with fourth granularity to the word sequence vector with fourth granularity.

3. The method of claim 1, wherein generating the first fusion vector based on the word sequence vector with first granularity and the word sequence vector with second granularity comprises:
generating a feature vector of the statement of the first event based on the word sequence vector with first granularity and the word sequence vector with second granularity;
obtaining an event relationship map, the event relationship map comprising statements of events and edges for connecting different statements of events, each edge for indicating a relationship of connected events corresponding to connected statements of events;
determining a statement of a target event, connected with the statement of the first event through a corresponding edge, based on the event relationship map; and
inputting the feature vector of the statement of the first event and a feature vector of the statement of the target event into a map learning model to obtain the first fusion vector of the statement of the first event.

4. The method of claim 1, wherein generating the second fusion vector based on the word sequence vector with third granularity and the word sequence vector with fourth granularity comprises:
generating a feature vector of the statement of the second event based on the word sequence vector with third granularity and the word sequence vector with fourth granularity;
obtaining an event relationship map, the event relationship map comprising statements of events and edges for connecting different statements of events, each edge for indicating a relationship of connected events corresponding to connected statements of events;
determining a statement of a target event, connected with the statement of the second event through a corresponding edge, based on the event relationship map; and
inputting the feature vector of the statement of the second event and a feature vector of the statement of the target event into a map learning model to obtain the second fusion vector of the statement of the second event.

5. The method of claim 1, wherein determining the relationship between the first event and the second event based on the first fusion vector and the second fusion vector comprises:
generating a third fusion vector by splicing the first fusion vector and the second fusion vector; and
determining the relationship based on the third fusion vector.

6. An electronic device, comprising:
at least one processor; and
a memory, communicatively coupled to the at least one processor,
wherein the memory is configured to store instructions executed by the at least one processor, and when the instructions are executed by the at least one processor, the at least one processor is caused to implement a method for generating a relationship of events, the method comprising:
obtaining a pair of events, the pair of events comprising a statement of a first event and a statement of a second event;
generating a word sequence vector with first granularity and a word sequence vector with second granularity based on the statement of the first event;
generating a word sequence vector with third granularity and a word sequence vector with fourth granularity based on the statement of the second event;
generating a first fusion vector based on the word sequence vector with first granularity and the word sequence vector with second granularity;
generating a second fusion vector based on the word sequence vector with third granularity and the word sequence vector with fourth granularity; and
determining a relationship between the first event and the second event based on the first fusion vector and the second fusion vector,
wherein generating the word sequence vector with first granularity and the word sequence vector with second granularity based on the statement of the first event comprises:
extracting events from the statement of the first event based on a grammatical order to generate a word sequence with first granularity;
converting the word sequence with first granularity to the word sequence vector with first granularity;
extracting events from the statement of the first event based on event arguments to generate a word sequence with second granularity; and
converting the word sequence with second granularity to the word sequence vector with second granularity.

7. The electronic device of claim 6, wherein generating the word sequence vector with third granularity and the word sequence vector with fourth granularity based on the statement of the second event comprises:
extracting events from the statement of the second event based on a grammatical order to generate a word sequence with third granularity;
converting the word sequence with third granularity to the word sequence vector with third granularity;
extracting events from the statement of the second event based on event arguments to generate a word sequence with fourth granularity; and
converting the word sequence with fourth granularity to the word sequence vector with fourth granularity.

8. The electronic device of claim 6, wherein generating the first fusion vector based on the word sequence vector with first granularity and the word sequence vector with second granularity comprises:
generating a feature vector of the statement of the first event based on the word sequence vector with first granularity and the word sequence vector with second granularity;
obtaining an event relationship map, the event relationship map comprising statements of events and edges for connecting different statements of events, each edge for indicating a relationship of connected events corresponding to connected statements of events;
determining a statement of a target event, connected with the statement of the first event through a corresponding edge, based on the event relationship map; and
inputting the feature vector of the statement of the first event and a feature vector of the statement of the target event into a map learning model to obtain the first fusion vector of the statement of the first event.

9. The electronic device of claim 6, wherein generating the second fusion vector based on the word sequence vector with third granularity and the word sequence vector with fourth granularity comprises:
generating a feature vector of the statement of the second event based on the word sequence vector with third granularity and the word sequence vector with fourth granularity;
obtaining an event relationship map, the event relationship map comprising statements of events and edges for connecting different statements of events, each edge for indicating a relationship of connected events corresponding to connected statements of events;
determining a statement of a target event, connected with the statement of the second event through a corresponding edge, based on the event relationship map; and
inputting the feature vector of the statement of the second event and a feature vector of the statement of the target event into a map learning model to obtain the second fusion vector of the statement of the second event.

10. The electronic device of claim 6, wherein determining the relationship between the first event and the second event based on the first fusion vector and the second fusion vector comprises:
generating a third fusion vector by splicing the first fusion vector and the second fusion vector; and
determining the relationship based on the third fusion vector.

11. A non-transitory computer readable storage medium having computer instructions stored thereon, wherein the computer instructions are configured to cause a computer to execute a method for generating a relationship of events, the method comprising:
obtaining a pair of events, the pair of events comprising a statement of a first event and a statement of a second event;
generating a word sequence vector with first granularity and a word sequence vector with second granularity based on the statement of the first event;
generating a word sequence vector with third granularity and a word sequence vector with fourth granularity based on the statement of the second event;
generating a first fusion vector based on the word sequence vector with first granularity and the word sequence vector with second granularity;
generating a second fusion vector based on the word sequence vector with third granularity and the word sequence vector with fourth granularity; and
determining a relationship between the first event and the second event based on the first fusion vector and the second fusion vector,
wherein generating the word sequence vector with first granularity and the word sequence vector with second granularity based on the statement of the first event comprises:
extracting events from the statement of the first event based on a grammatical order to generate a word sequence with first granularity;
converting the word sequence with first granularity to the word sequence vector with first granularity;
extracting events from the statement of the first event based on event arguments to generate a word sequence with second granularity; and
converting the word sequence with second granularity to the word sequence vector with second granularity.

12. The non-transitory computer readable storage medium of claim 11, wherein generating the word sequence vector with third granularity and the word sequence vector with fourth granularity based on the statement of the second event comprises:
extracting events from the statement of the second event based on a grammatical order to generate a word sequence with third granularity;
converting the word sequence with third granularity to the word sequence vector with third granularity;
extracting events from the statement of the second event based on event arguments to generate a word sequence with fourth granularity; and
converting the word sequence with fourth granularity to the word sequence vector with fourth granularity.

13. The non-transitory computer readable storage medium of claim 11, wherein generating the first fusion vector based on the word sequence vector with first granularity and the word sequence vector with second granularity comprises:
generating a feature vector of the statement of the first event based on the word sequence vector with first granularity and the word sequence vector with second granularity;
obtaining an event relationship map, the event relationship map comprising statements of events and edges for connecting different statements of events, each edge for indicating a relationship of connected events corresponding to connected statements of events;
determining a statement of a target event, connected with the statement of the first event through a corresponding edge, based on the event relationship map; and
inputting the feature vector of the statement of the first event and a feature vector of the statement of the target event into a map learning model to obtain the first fusion vector of the statement of the first event.

14. The non-transitory computer readable storage medium of claim 11, wherein generating the second fusion vector based on the word sequence vector with third granularity and the word sequence vector with fourth granularity comprises:
generating a feature vector of the statement of the second event based on the word sequence vector with third granularity and the word sequence vector with fourth granularity;
obtaining an event relationship map, the event relationship map comprising statements of events and edges for connecting different statements of events, each edge for indicating a relationship of connected events corresponding to connected statements of events;
determining a statement of a target event, connected with the statement of the second event through a corresponding edge, based on the event relationship map; and
inputting the feature vector of the statement of the second event and a feature vector of the statement of the target event into a map learning model to obtain the second fusion vector of the statement of the second event.

15. The non-transitory computer readable storage medium of claim 11, wherein determining the relationship between the first event and the second event based on the first fusion vector and the second fusion vector comprises:
generating a third fusion vector by splicing the first fusion vector and the second fusion vector; and
determining the relationship based on the third fusion vector.

* * * * *